United States Patent
Paine et al.

[15] 3,670,202
[45] June 13, 1972

[54] ULTRASTABLE CALIBRATED LIGHT SOURCE

[72] Inventors: Thomas O. Paine, Administrator of the National Aeronautics and Space Administration with respect to an invention of; Michael F. Heidt, 3530 Nasa Road 1, Apt. 40, Seabrook, Tex. 77586; John E. Novotny, 3904 Arlington Square Drive 021; Naranappa K. Shankar, 702 Gilpin Street, both of Houston, Tex. 77034

[22] Filed: July 31, 1970

[21] Appl. No.: 59,956

[52] U.S. Cl. ............ 315/297, 315/158, 250/205, 315/307, 315/310, 315/311, 315/151, 315/156
[51] Int. Cl. ............................................. H05b 37/02
[58] Field of Search ............ 250/205; 315/297, 307, 310, 315/311, 151, 156, 158; 331/109, 183

[56] References Cited

UNITED STATES PATENTS

| | | |
|---|---|---|
| 3,200,348 | 8/1965 | Kammiller et al. ................... 331/183 |
| 3,431,427 | 3/1969 | Pahl, Jr. ................................. 315/151 |
| 3,440,488 | 4/1969 | Skirvin .................................. 315/156 |
| 3,456,155 | 7/1969 | Buchanan ............................. 315/151 |
| 3,473,084 | 10/1969 | Dodge .................................. 315/151 |
| 3,558,892 | 1/1971 | Seeley .................................. 315/151 |

*Primary Examiner*—John Kominski
*Attorney*—Marvin J. Marnock, John R. Manning and Marvin F. Matthews

[57] ABSTRACT

Light from an electrically powered light source is optically monitored by a transducer which converts the optical signal to an electrical error signal. The error signal is compared with a reference signal and a signal representing the difference between the reference and the error signals is generated. The difference signal is employed to control an electronic switching network which in turn regulates the electrical power input to the light source to maintain a constant light level at the optical monitor.

7 Claims, 3 Drawing Figures

MICHAEL F. HEIDT
JOHN E. NOVOTNY
NARANAPPA K. SHANKAR
INVENTORS

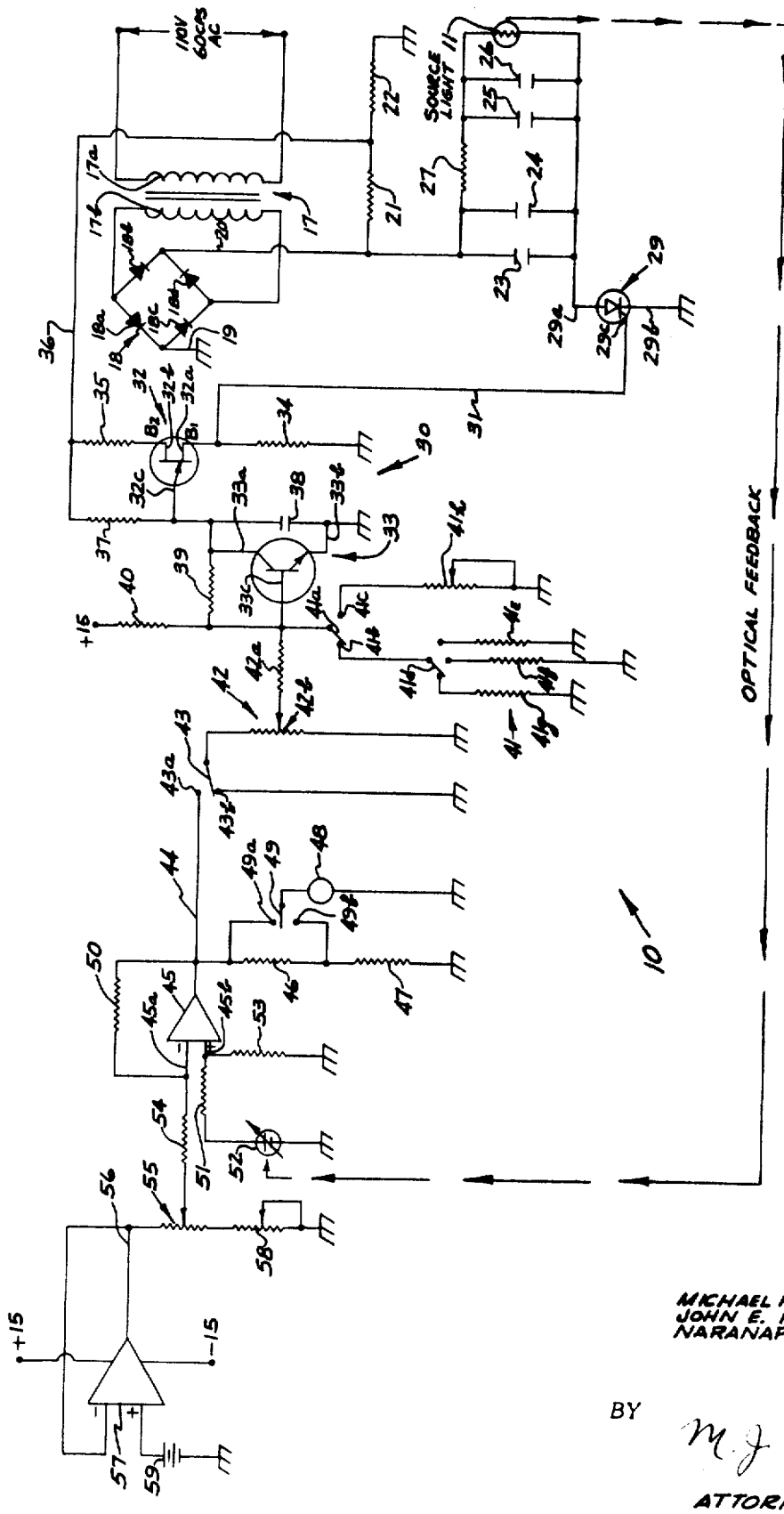

ULTRASTABLE CALIBRATED LIGHT SOURCE

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates generally to the field of testing and measurement of physical phenomena. More specifically, the present invention relates to means for generating a predetermined energy output level to form a standard to which a variable or unknown energy level may be conformed or against which it may be compared.

The present invention includes a system for producing an extremely stable, precisely calibrated light source having a long useful life time. It is anticipated that the invention will be employed in the field of testing, measuring and experimentation including the performance of routine radiometric calibrations, fluid mechanics experimentation, interferometry research, the measurement of the optical properties of windows employed in spacecraft such as the Apollo spacecraft, and radiometric calibration of flight photometers.

2. Brief Description of the Prior Art

Prior art systems designed to maintain a fixed optical output conventionally operate on the principle of monitoring the electrical power input to the optical energy source and maintaining the power input constant to maintain the optical output of the source at a fixed level. The optical output of systems of this type are employed in experimentation or as a reference standard against which light sensitive devices can be calibrated.

While the conventional prior art approach toward formation of a reference optical output is satisfactory for many applications, the advent of highly sensitive optical detectors and improved electrical systems has led to the development of equipment systems requiring increased stability in the energy level of the optical output as well as ability to more precisely calibrate the energy level of the output.

One of the primary shortcomings of prior art systems which attempt to maintain a stable output by monitoring the power input to the output device is that the level of the optical energy generated by the output device may vary even though the power supplied to the device remains at a constant level. Such output variations may occur from aging or other changes in the components forming the optical output device. Prior art systems of this type customarily have stability equal to approximately 0.02 percent with approximately 50 hours of useful life for each calibration. In addition, calibration of these systems is usually difficult and time consuming with the result that typical systems are normally operated at only a single color temperature.

The prior art also includes systems in which an optical energy output level is maintained at a relatively fixed value by means of a light sensitive monitoring system. None of such systems, however, have included means suitable for forming and maintaining an ultrastable energy level which may be set and regulated over prolonged time periods with a high degree of precision. In certain of these prior art control systems, an optical feedback link is employed to control servo mechanisms which in turn regulate the amount of power supplied to the source of the optical energy. It is evident that the inherent delays required with servo mechanisms are undesirable in a system which may be employed as a reference standard for extremely sensitive, high speed equipment.

The prior art also includes systems which employ an optical link in a feedback loop with a light sensitive transducer in a bridge network being employed for the purpose of detecting variations in the energy level output from the optical energy source. These systems, however, are limited to employing photoconductive type transducers.

In general, the prior art devices previously discussed, have been unsatisfactory for use in calibrating highly sensitive, fast acting equipment requiring long life, precisely established, ultrastable energy output levels.

SUMMARY OF THE INVENTION

The ultrastable calibrated light source of the present invention includes a control system having a direct optical link forming part of a feedback loop. Information obtained from the optical link in the feedback loop is used to control the amount of power supplied to an optical energy producing means to maintain an ultrastable, precisely calibrated optical output. By including an optical link in the feedback line, the optical energy output from the optical device being automatically regulated is maintained at a fixed value irrespective of variations in the physical or electrical characteristics of the optical device. Thus, where the optical device is an incandescent bulb, aging of the bulb envelope or a change in the characteristics of the filament have no effect on the level of light energy emitted by the device since the information fed back to the control system is dependent upon output light levels rather than electrical power input.

A fast acting, high-power-capacity switching circuit is employed in the present invention to reduce the response time of the system to permit it to be employed with light sources having large power requirements. The active elements of the switching circuit include a silicon controlled rectifier (SCR), a unijunction transistor (UJT), and a transistor which cooperate to switch on and deliver relatively high levels of energy to the light device. The transistor is connected across a capacitor included in the biasing network of the UJT to control leakage across the capacitor which in turn changes the time constant in the UJT's biasing network. Variation in the time constant in the UJT biasing network regulates conduction through the UJT to trigger conduction through the SCR which in turn regulates the application of power to the lamp. The switching function of the circuit is phase locked with the AC ripple in the output from a full wave rectifier in the system's power supply to precisely regulate the amount of power being supplied to the lamp.

The electrical signal received from the light-to-electrical transducer in the optical link is compared against a precisely maintained reference voltage with any difference in voltages acting through the previously described switching circuit to vary the power supplied to the light source until the difference is eliminated. The internal reference voltage is generated by employing a small voltage value battery in combination with a unity gain operational amplifier which forms and precisely maintains the fixed reference voltage at its output.

The sensitivity of the system may be quickly and easily reset for each new calibration. The total system functions to provide a long life ultrastable device which is quickly and easily calibrated.

The foregoing and other objects and advantages of the present invention will become more apparent from the following specification and related drawings.

BRIEF DESCRIPTION OF THE DRAWINGS

FIG. 2 is a detailed schematic diagram illustrating a preferred construction of the light source of the present invention.

DESCRIPTION OF THE PREFERRED EMBODIMENTS

Figure 1:
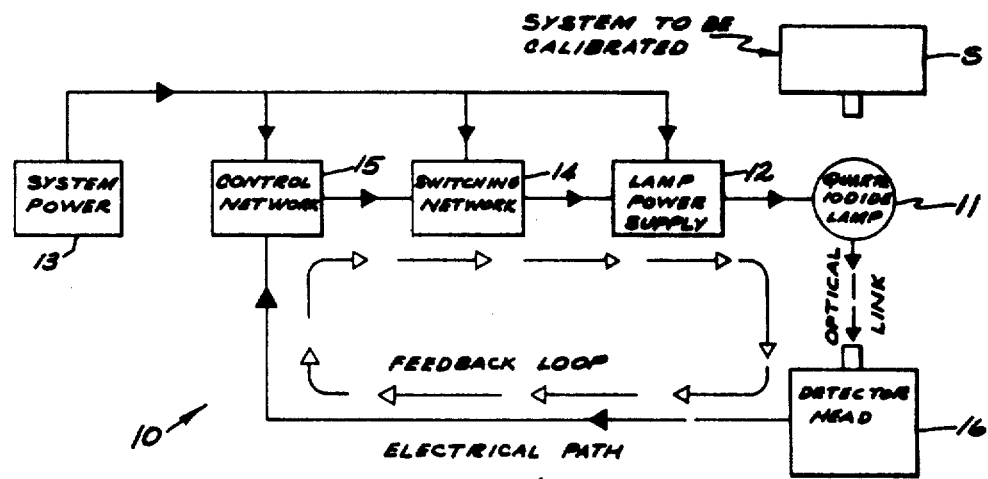
FIG. 1 is a block diagram broadly illustrating the ultrastable calibrated light source of the present invention.

Referring to FIG. 1, the ultrastable light source of the present invention is indicated generally at 10. The system of the invention includes a suitable means of optical energy generation such as quartz iodide lamp 11. Power is supplied to the lamp through a lamp power supply 12 which in turn derives its power from a system power source 13. Operation of the lamp power supply 12 is controlled directly by a switching network 14 which in turn is regulated by a network control circuit 15. The switching network 14 and control network 15 also derive their power from the system power source 13. The optical output from the lamp 11 is monitored by a suitable optical-to-electrical transducer such as the detector head 16 and the electrical signal generated by the detector head 16 is transmitted to the control network 15 to complete a feedback loop.

The signal formed by the detector head and supplied to the control network 15 is compared to a reference signal formed within the control network. A signal representing the difference between the reference and the error signals is then formed in the control network and transmitted to the switching network 14. This difference signal activates the switching network 14 causing it to form a control signal which is transmitted to the lamp power supply 12 which in turn regulates the electrical power supplied to the lamp 11. By this means, the energy level of the optical signal generated by the lamp 11 is automatically maintained at a predetermined energy level.

The regulated optical output of the lamp 11 may be employed as a reference standard against which an optically sensitive system S may be calibrated. It should be emphasized that the functional description of FIG. 1 is for the purpose of explaining the broad operating principles of the invention. The preferred form of the specific circuitry employed to implement the principles of the invention in an improved manner is illustrated in FIG. 2 of the drawings.

Referring to FIG. 2 of the drawings, system power is supplied to the network through a one-to-one transformer 17 which includes a primary winding 17a and a secondary winding 17b. Conventional 110 volt, 60 cps alternating current power is supplied to the input winding 17a of the transformer 17. The resulting output voltage appearing across the secondary winding 17b is supplied to a conventional diode bridge 18 which includes four semi-conductor diodes 18a, 18b, 18c and 18d connected in the manner illustrated. The rectifier bridge 18 converts the AC power appearing across the winding 17b to full wave rectified DC power across output leads 19 and 20. While the bridge rectifies the AC input to form a DC output, it will be understood that a 60 cps ripple remains in the output signal appearing across the leads 19 and 20. The transformer 17 is employed as an isolation transformer to eliminate ground loops and grounding problems associated with the active components in the switching circuit of the system.

The output conductor 19, on which the negative polarity of the rectified power signal appears, extends from the rectifier 18 to system ground. The positive side of the rectified output is supplied through the conductor 20 to a voltage divider network formed by the series connection of two resistors 21 and 22. The line 20 is also connected to a ripple smoothing filter network which includes capacitors 23, 24, 25, 26 and a resistor 27. The filtered power signal from the bridge 18 is supplied to the quartz iodide lamp 11 through resistor 27.

The essentially unfiltered output appearing across capacitors 23 and 24 of the filter network is supplied to the anode 29a of a silicon controlled rectifier (SCR) indicated generally at 29. The cathode 29b of the SCR 29 is connected to system ground while the gate 29c is connected to a trigger circuit indicated generally at 30 through a conductor 31.

The trigger circuit 30 includes a unijunction transistor (UJT) indicated generally at 32 and a NPN transistor indicated generally at 33. The first base ($B_1$) 32a of the UJT is connected to the gate of the SCR and to a grounded resistor 34. The second base ($B_2$) 32b of the UJT is connected to a biasing resistor 35 which is connected at its opposite end to a power supply line 36. The line 36 also carries the unfiltered power signal appearing at the common connection between the resistors 21 and 22 to a biasing resistor 37 through which it is conveyed to the emitter 32c of the UJT 32. The cathode 33a of the transistor 33 is also connected to the UJT emitter 32c while the emitter 33b of the transistor 33 is connected to system ground.

The resistor 37 cooperates with a capacitor 38 connected between the cathode and emitter of the transistor 33 to form a UJT biasing network having a variable RC time constant. As will be seen, conduction of the transistor 33 regulates leakage across the capacitor 38 to vary the RC time constant of the circuit biasing the UJT 32.

The circuitry associated with the transistor 33 includes a large value resistance 39 connected between the base 33c and cathode 33a of the transistor to improve circuit linearity. Power is supplied to the base of the transistor 33 from a positive 15 volt power supply through a resistor 40. The base of the transistor 33 may be adjustably biased with the biasing circuit indicated generally at 41. The circuit 41 is employed to establish the approximate level of operation of the lamp 11. The circuit includes a switch contact 41a movable between two switch points 41b and 41c which in turn are electrically connected to resistive elements. The network associated with contact 41b includes a second switching contact 41d which may be moved to form electrical contact with a series of grounded resistive elements 41e, 41f and 41g. The switching point 41c is electrically connected to a potentiometer 41h having its tap and remote end connected to the system ground. By appropriate positioning of switching contacts 41a and 41d, the effective resistance of the biasing circuit 41 and the resulting operating point of the transistor 33 may be selectively altered. With the potentiometer 41h connected into the base of the transistor, continuous resistance values may be obtained. Where resistive elements 41g, 41h or 41i are connected into the transistor base, three discrete resistance values may be obtained. It will be appreciated that since the value of the resistance selected by the biasing circuit 41 determines the amount of power supplied to the lamp 11, the resistances 41e, 41f, and 41g may have a value designed to provide a predetermined, fixed percentage of rated lamp power input, as for example, 20 percent, 50 percent and 100 percent respectively. Similarly, the potentiometer 41h preferably includes ample resistance to provide continuous variation between 0 and 100 percent of full rated power input to the lamp 11.

Sensitivity of the switching circuit may be determined by a sensitivity adjusting circuit indicated generally at 42 which includes a resistive element 42a extending between the base of the transistor 33 and the wiper arm of a potentiometer 42b. The resistive element of the potentiometer 42b is connected between system ground and an on-off switching contact 43 which is movable between two switching points 43a and 43b. The switching point 43b is electrically connected to system ground while the contact 43a is connected by a line 44 to the output of an operational amplifier 45, to permit the feedback and reference signals to be temporarily removed from the switching and power supply portion of the system during the initial calibration procedure.

The circuitry associated with the operational amplifier 45 compares the feedback signal against an internally formed reference signal. The output signal appearing on the line 44 represents the difference between the feedback and reference signals. This difference signal is formed across a voltage divider network formed by the series connection of two resistors 46 and 47. A voltage meter 48 employed in establishing the desired difference signal during initial calibration is connected between system ground and a switching contact which is movable between two switching points 49a and 49b. The point 49a is electrically connected to the top of the resistor 46 while the other contact 49b is connected across the resistor 47 so that the full difference signal on the line 44 appears across the meter with the contact 49 engaging the point 49a and a significantly reduced signal appears across the meter with the contact 49 engaging the point 49b.

The output from the amplifier 45 is fed back to a negative input 45a of the amplifier through a series resistor 50. The system feedback signal is provided to the positive input 45b of the amplifier 45 through resistor 51 connected in series with a grounded solar cell 52. The solar cell 52 converts light energy emitted from the lamp 11 into an electrical voltage which is introduced into the amplifier 45 across a grounded input resistor 53.

The fixed internal reference voltage against which the solar cell voltage is compared is supplied to the negative input 45a of the amplifier through a series resistor 54 connected to the wiper arm of a potentiometer 55. The resistive component of the potentiometer 55 is connected between the output 56 of a unity gain operational amplifier 57 and a grounded potentiometer 58 having its wiper arm also connected to system ground. The amplifier 57 is powered by positive and negative DC supplies which are held within very close tolerances to increase signal stability at the amplifier output. The output of the amplifier is fed back to the negative input and the positive input signal is supplied by a small DC source or battery 59 connected between the positive input terminal and system ground. The voltage value of the battery 59 is employed as a stable reference and the voltage value is precisely reproduced at the output 56 of the amplifier 59 to serve as an ultrastable reference voltage source for the amplifier 45.

SET UP PROCEDURE AND FUNCTIONAL DESCRIPTION OF FIGURE 2

Power from a conventional 110 volt, 60 cps AC power supply is provided across the input windings of the isolation transformer 17. The resulting voltage occuring across the secondary winding 17b of the transformer is applied to a full wave rectifier which provides a rectified voltage across the lines 19 and 20. It will be understood that the voltage signal occurring across the bridge output lines 19 and 20 will be full wave rectified but will have a 60 cycle per second ripple associated with the 60 cps input wave form. The UJT 32 is designed to be phase locked with the ripple in the rectified voltage supply. Thus, the UJT 32 conducts only during a portion of the ripple cycle so that the SCR 29 is triggered into conduction at a point in time which is keyed to the phase of the ripple in the rectified power input. The UJT 32 conducts between $B_1$ and $B_2$ according to the phase of the ripple in the rectified power input to produce a trigger pulse which biases the SCR into conduction. By thus relating conduction of the UJT 32 and the SCR 29 to the phase of the ripple in the rectified power input, the amount of power supplied to the lamp 28 is precisely controlled even where the power requirements of the light source are relatively high. In the described arrangement of FIG. 2, the advantageous features of a sharp triggering pulse as produced by the UJT may be employed to enhance circuit performance in biasing the SCR 29 into conduction.

Conduction from $B_2$ to $B_1$ is permitted only when the UJT 32 is properly biased between the emitter 32c and $B_1$. Control of this biasing level is in turn regulated by the transistor 33. The resistor 37 and capacitor 38 form an RC network which biases the UJT and in turn controls conduction between the emitter 32c and the $B_1$ base 32a. The RC time constant controls conduction from $B_1$ to $B_2$ which is required for formation of the triggering pulse to the SCR and the transistor 33 is connected across the capacitor 38 to provide a controlled leakage across the capacitor to regulate its charging time. The transistor 33 is thus employed essentially to vary the RC time constant between the resistor 37 and the capacitor 38 which in turn regulates triggering of the UJT.

The biasing network 41 positioned at the base of the transistor 33 provides rough control over the level at which the transistor 33 will conduct. By appropriately setting the switch contacts 41a and 41d, the steady state energy output of the lamp 11 may be varied discretely when the switch contact 41a is in contact with the point 41b or continuously when it is in contact with 41c. It will, of course, be understood that any desired number of resistors having different resistance values may be employed with the switching contact 41d. Thus, the biasing resistance supplied to the base of the transistor 33 provides a selectable operating range within which the optical output level of the lamp 28 is to be regulated.

The potentiometer 42 connected to the base of the resistor 33 may be adjusted to vary the amplitude of the difference signal supplied to the base of the transistor. By this means, the potentiometer 42 provides a sensitivity control for the entire system in that it determines the amount of feedback which will be effectively supplied to the transistor. For example, with the wiper of the potentiometer 42 adjacent the top of the resistive element, the full voltage output from the operational amplifier 45 is supplied to the base of the transistor 33. At the bias point of the transistor, large amplitude variations raise the bias across the resistor very quickly which reduces the time required to bias the transistor into conduction. Since there is a rise time associated with the RC time constant for the UJT 32, a strong bias of the transistor increases the charging time of the capacitor 38 thus increasing the time required to bias the UJT into conduction. The increased time required to switch the UJT 32 into conduction is carried into the triggering of the SCR 29 causing the entire system to react more slowly. With the wiper arm of the potentiometer 42b moved in the opposite direction, the reverse is true and the switching speed of the circuit is increased appreciably. For each resistance value switched into the base of the transistor 33, the optimum sensitivity setting may be established with proper adjustment of the potentiometer 42b. Such adjustment is normally desirable since too slow a response time in the switching circuit is undesirable and too fast a response time may send the entire system into oscillation.

During the initial calibration of the system, the switch 43 is first moved into position with the switching point 43b to provide zero input into the switching circuitry. With the switch 43 in this position, the bias on the transistor 33 is controlled solely by the resistance value appearing within the circuit 41 and the desired optical output of the lamp 28 may be established by selecting the appropriate resistance value for the biasing circuit 41.

During this initial setting up of the circuitry, with the switch contact 43 still connected to the grounded switching point 43b, the lamp 11 operates at some energy level which is monitored by the solar cell 52. The electrical output from the solar cell 52 is applied to the operational amplifier 45 and a voltage signal is produced at the output of the amplifier across the series resistors 46 and 47. The switch 49 is then moved to the switching point 49b and the potentiometer 55 is adjusted until the voltage meter 48 indicates that the voltage appearing at the output of the amplifier 45 is approximately zero which gives a rough indication of the amplifier output. Preferably, the voltage meter 48 is a center zero meter so that the wiper arm position on the potentiometer 55 is varied until the indicator of the meter 48 is approximately centered. The switching contact 49 is then moved into engagement with the switching point 49a so that the voltage meter is connected to the full voltage output of the amplifier 45. The potentiometer 58, which has a smaller value resistive component than the potentiometer 55, is then adjusted to again provide a zero output indication on the volt meter 48 so that the output from the operational amplifier 45 is thereby very precisely established. After having thus fixed a precise output level from the amplifier 45, the switching contact 43 is returned to engagement with the switching point 43a to connect the system together and initiate automatic control of the lamp output.

When the optical energy emitted by the lamp 11 varies, the light falling upon the solar cell 52 also varies causing a corresponding variation in the voltage signal supplied to the positive input of the operational amplifier 45. Where the solar cell voltage is larger than the reference voltage, a negative voltage is produced at the output of the operational amplifier 45 which changes the bias on the transistor 33 which in turn acts through the switching circuit and in cooperation with the SCR 29 to decrease the amount of power supplied to the lamp 11 until the optical energy level returns to the pre-established value. Where the light level is lower than originally set, the opposite change occurs through the circuit and increased power is supplied to the lamp 11.

In the form of the invention constructed in accordance with the circuit diagram of FIG. 2, the following components were employed:

TABLE I.—ACTIVE ELEMENTS

| Component | Reference character | Ratings |
| --- | --- | --- |
| Isolation transformer made by Acme Electric Corporation Model T-53041-S. | 17 | Single phase, 60 cps., 1.5 kva. additive polarity 120/120//120/120. |
| Operational amplifiers made by Nexus Research Lab., Inc. Model FET 11-A. | 45, 57 | Open loop gain 10k; differential input impedence 10 ohms. |
| Silicon controlled rectifier (SCR) made by RCA, Model 2N1846A | 29 | Maximum forward volts 200 switching current 80 ma. forward current rating 16a. |
| Semiconductor diodes made by General Electric, Model 1N1190R | 18a, 18b, 18c, 18d | 600 peak reverse voltage 500 amp peak surge current. |
| Unijunction transistor made by General Electric, Model 2N2646. | 32 | $P_D=300$ mw., $I_e=5$ ma. $V_{B_2B_1}=35$. |
| Transistor made by General Electric, Model 2N744 NPN. | 33 | $P_c=300$ mw., $V_{co}=12$, $I_c=200$ ma. |
| Solar cell made by Infrared Corp., type B2M (2 employed in series). | 52 | Each cell output equals 0.4 volts at 2 ma. |
| Quartz iodide lamp (Sun Gun) made by General Electric, Type DXW. | 11 | 120 volts, 1,000 watts. |
| Battery made by Everready, D Cell. | 59 | 1.45 volts. |
| Voltage meter (VTVM) made by Metronix, Model 320C.5. | 48 | Center scale zero. |

TABLE II.—RESISTIVE ELEMENTS

| Reference character | Ratings in ohms | Reference character | Ratings in ohms |
| --- | --- | --- | --- |
| 21 | 10 K | 42a | 10 K |
| 22 | 1.5 K | 42b | 10 K pot. |
| 27 | 100 | 46 | 3 meg. |
| 34 | 100 | 47 | 100 K. |
| 35 | 150 | 50 | 500 K. |
| 37 | 21.5 K | 51 | 16 K. |
| 39 | 1 meg | 53 | 500 K. |
| 40 | 50 K | 54 | 16 K. |
| 41h | 10 K pot | 55 | 1 K pot. |
| 41f, 41g, 41h | As required | 58 | 100 pot. |

TABLE III
[Capacitive elements]

| Reference character | Rating in microfarads |
| --- | --- |
| 23, 24, 25, 26 | 1,650 |
| 38 | 0.1 |

In a circuit employing the above-listed components, it was observed that the optical output level of the lamp 11 could be maintained within 0.007 percent of the calibrated level for prolonged periods of time well beyond those observed with conventional systems which monitor power input rather than optical output.

Figure 3:
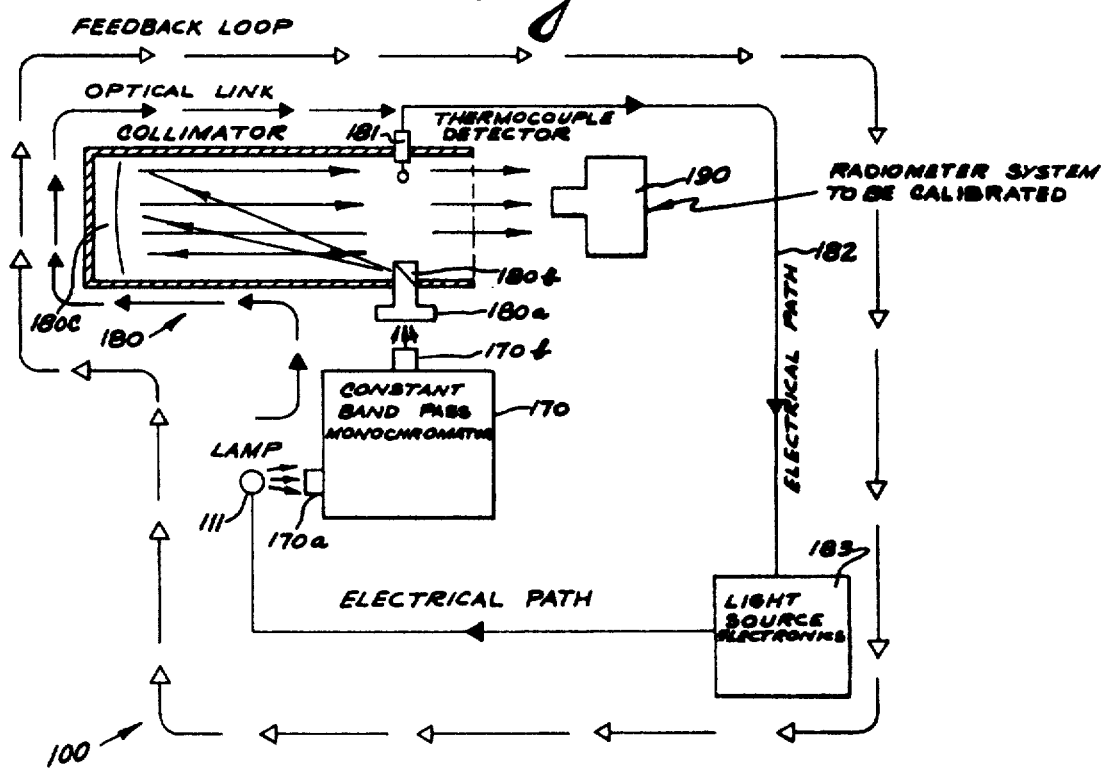
FIG. 3 is a schematic block diagram illustrating a modified form of the present invention employed with a linear output monochrometer.

Referring now to FIG. 3, the ultrastable light source of the present invention is illustrated in a modified form indicated generally at 100 employed as a linear output monochromator. The modified form of the invention is essentially similar to that illustrated in FIGS. 1 and 2 with the exception that the optical feedback loop has been modified to include a constant band pass monochromator 170 and a collimator indicated generally at 180. Light produced by a quartz iodide lamp 111 is exposed to the light input 170a of the monochromator which selectively emits only that light which is within a given wave length range through the output 170b. The processed light is introduced into an entrance aperture 180a formed in the collimator 180 where it strikes a reflecting prism 180b. The prism directs the light to an off-axis parabolic mirror 180c which in turn reflects the light toward the open end of the collimator in parallel lines.

A portion of the collimated light reflected from the mirror 180c is sampled by a thermocouple 181. The thermocouple preferably includes a pair of conventional thermocouple elements connected in series and covered with a suitable, light absorbing black covering. The light falling on the series connected thermocouple elements is absorbed and converted into thermal energy which in turn is converted into an electrical energy signal. The electrical signal is transmitted over the line 182 to the control network 183.

The modified form of the invention illustrated in FIG. 3 operates to maintain a constant light output from the collimator 180 by monitoring the collimated, optical output from the collimator, converting the monitored optical signal to an electrical signal, comparing the electrical signal produced by the transducer against a fixed reference signal, forming a difference signal and employing the difference signal to alter the power supplied to the lamp 111. Variation of the power supplied to the lamp 111 varies the optical energy supplied to the input 170a of the monochrometer which changes the energy level of the filtered light input into the collimator until the desired collimator output is obtained.

The thermocouple 181 is employed rather than a light sensitive solar cell in that the former forms a linear output whereas the output from the solar cells is normally non-linear. The constant band pass monochrometer 170 is conventional and is designed to filter light from a source and transmit only that light energy falling within a predetermined wave length range. The monochromator may include a diffraction grating system in combination with suitable filters or if desired, the filtration may be accomplished solely by the use of a plurality of interference filters each of which has the same band pass characteristics. It should also be noted that a conventional prism monochromator may be employed for the monochromator 170, however, the output from prism monochromators is generally not as linear as that from a diffraction grating monochromater and may be unsuitable for some purposes.

The ultrastable collimated light emanating from the collimator 180 may be employed to adjust or calibrate a light sensitive device 190. In the way of example rather than limitation, the device 190 may be a camera where the sensitivity film inside the camera is to be measured. The device 190 may be a photometer such as a photomultiplier tube having an interference filter positioned between it and the output of the collimator where it is desired to know how the tube responds electrically to various energy levels at the wave lengths passed by the filter.

The foregoing disclosure and description of the invention is illustrative and explanatory thereof, and various changes in the size, shape and materials as well as in the details of the illustrated construction may be made within the scope of the appended claims without departing from the spirit of the invention. For example, while the present invention has been described with specific reference to a system for maintaining the energy output of an optical device at the predetermined level, it should be noted that the invention may also be employed to maintain the energy level of any energy producing means at a predetermined fixed value. Thus, where the energy producing means is a sound producer, a sound-to-electricity transducer may be employed rather than the solar cell or thermocouple transducers specifically described herein. Where the energy producing means is a heat generator, a heat-to-electricity transducer may be employed. Thus, the scope of the present invention encompasses a system wherein the level of the energy output from an energy forming means of any type is monitored by a transducer sensitive to that energy.

What is claimed is:

1. A system for producing a precisely calibrated energy output level and maintaining said output level for extended periods of time comprising:
   radiant energy producing means for forming a detectable energy output;
   power supply means connected with said energy producing means for supplying power to said energy producing means, said power supply means including rectifier means for converting alternating current to full wave rectified direct current power having amplitude fluctuations occurring at a frequency corresponding to the frequency of said alternating current power;

monitoring means for monitoring said detectable energy output and forming a first electrical signal representative of the value of said energy output;

ultrastable reference signal forming means for generating an ultrastable electrical reference signal;

comparing means for comparing said reference signal and said first electrical signal and forming a second electrical signal representing the difference between said reference signal and said first electrical signal;

control switching means operable by said second electrical signal to electrically connect or disconnect said power supply means and said light energy producing means to control the power supplied to said light energy producing means to control switching means comprising a silicon controlled rectifier for selectively conducting said full way rectified power to the radiant energy producing means and trigger circuit means to selectively trigger said silicon controlled rectifier into and out of the conduction state, said trigger circuit means comprising a unijunction transistor means and biasing circuit means for regulating conduction through said unijunction transistor means, said biasing circuit means including capacitive means for storing an electrical charge and a transistor switching means for regulating the leakage across said capacitive means and the charge storage by said capacitive means to regulate conduction through said unijunction transistor means;

means for phase locking said full wave rectified power and said unijunction transistor means, whereby said unijunction transistor means is rendered conductive during a portion of the power phase as controlled by said biasing circuit means to precisely regulate the amount of power supplied to said radiant energy producing means; and filtering means for filtering the full wave rectified power conducted through said silicon controlled rectifier whereby a constant direct current voltage is delivered to said radiant energy producing means to maintain an ultrastable radiant energy output.

2. The system as defined in claim 1 wherein said ultrastable reference signal forming means includes a unity gain operational amplifier, a battery cell connected to the positive input terminal of the amplifier for applying a positive voltage thereto, and feedback means for coupling the output of the amplifier to the negative input terminal of the amplifier whereby an ultrastable electrical reference signal is generated.

3. The system as defined in claim 2 wherein said comparing means includes a second operational amplifier having a pair of input terminals with one input terminal coupled to the output of said first mentioned operational amplifier and the other input terminal coupled to said monitoring means to receive said first electrical signal representative of the value of said radiant energy output.

4. The system as defined in claim 1 wherein said radiant energy producing means is a light producing means, said system further including light treating means included between said light energy producing means and said monitoring means for converting said optical output to processed light falling within a preselected wave length range;

collimator means exposed to said processed light for collimating said processed light; and thermocouple means included with said monitoring means for converting said collimated light to an electrical signal.

5. The system as defined in claim 4 wherein said monitoring means is a photovoltaic device.

6. The system as defined in claim 1 wherein said switching means includes adjustable biasing means for adjusting the operating point of said transistor switching means whereby the energy value at which said energy producing means is to operate may be selectively determined.

7. The system as defined in claim 1 further including:

a. means for adjusting the value of said reference signal;

b. means for adjusting the output of said comparing means; and c. means for altering the sensitivity of said control means.

* * * * *